(12) United States Patent
Tao et al.

(10) Patent No.: US 11,409,148 B2
(45) Date of Patent: Aug. 9, 2022

(54) DISPLAY DEVICE COMPRISING A BACK PLATE HAVING A SIDE WALL PART THAT INCLUDES A PLURALITY OF BUMPS WITH A SAME HEIGHT AND ARRANGED AT INTERVALS AND METHOD FOR MANUFACTURING THE SAME

(71) Applicants: Hefei Xinsheng Optoelectronics Technology Co., Ltd., Anhui (CN); BOE TECHNOLOGY GROUP CO., LTD., Beijing (CN)

(72) Inventors: Ran Tao, Beijing (CN); Fei Ling, Beijing (CN); Yong Ma, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/214,378

(22) Filed: Mar. 26, 2021

(65) Prior Publication Data
US 2022/0026758 A1   Jan. 27, 2022

(30) Foreign Application Priority Data
Jul. 23, 2020   (CN) .......................... 202010717841.X

(51) Int. Cl.
*G02F 1/1333* (2006.01)
*G02F 1/13357* (2006.01)

(52) U.S. Cl.
CPC .... *G02F 1/133314* (2021.01); *G02F 1/13332* (2021.01); *G02F 1/133308* (2013.01);
(Continued)

(58) Field of Classification Search
CPC ................................................ G02F 1/133328
See application file for complete search history.

(56) References Cited

U.S. PATENT DOCUMENTS

2015/0293388 A1   10/2015   Tanaka et al.
2016/0054613 A1*   2/2016   Lee ................... G02F 1/133308
                                                        362/97.2
(Continued)

FOREIGN PATENT DOCUMENTS

CN   204790243 U   11/2015
CN   206224339 U    6/2017
(Continued)

OTHER PUBLICATIONS

China Patent Office, Novelty search report.
Chunpeng Chai, "Polymer Synthetic Materials", Beijing Institute of Technology Press, Jan. 2019.

*Primary Examiner* — Paul C Lee
(74) *Attorney, Agent, or Firm* — Houtteman Law LLC

(57) ABSTRACT

Provided are a display device and a method for manufacturing the same, the display device includes: a back plate, a cover plate and a display panel, the cover plate is opposite to the back plate, the cover plate has a central area and a peripheral area, the display panel is fixed to the central area, the back plate includes a base plate and a side wall part, a surface of the side wall part facing the cover plate is a bonding surface; a portion of areas on the bonding surface are provided with a supporting structure, which includes multiple bumps with a same height and arranged at intervals, surfaces of the bumps facing the cover plate contact the peripheral area; a structural adhesive is provided between a portion of the bonding surface without the supporting structure and the cover plate to fix the cover plate to the bonding surface.

15 Claims, 3 Drawing Sheets

(52) U.S. Cl.
CPC .. *G02F 1/133317* (2021.01); *G02F 1/133328* (2021.01); *G02F 1/133608* (2013.01); *G02F 2202/28* (2013.01)

(56) References Cited

U.S. PATENT DOCUMENTS

| | | | |
|---|---|---|---|
| 2016/0377908 A1* | 12/2016 | Shin | G02F 1/133308 349/58 |
| 2018/0356672 A1* | 12/2018 | Kim | G02F 1/1339 |
| 2018/0373086 A1* | 12/2018 | Zeng | G02B 6/0086 |
| 2019/0114010 A1* | 4/2019 | Chiu | G06F 1/1601 |
| 2021/0033912 A1 | 2/2021 | Xiao | |

FOREIGN PATENT DOCUMENTS

| | | |
|---|---|---|
| CN | 110379303 A | 10/2019 |
| CN | 210181952 U | 3/2020 |

\* cited by examiner

DISPLAY DEVICE COMPRISING A BACK PLATE HAVING A SIDE WALL PART THAT INCLUDES A PLURALITY OF BUMPS WITH A SAME HEIGHT AND ARRANGED AT INTERVALS AND METHOD FOR MANUFACTURING THE SAME

CROSS REFERENCE TO RELATED APPLICATIONS

The present application claims priority from Chinese patent application No. 202010717841.X filed by the Chinese Intellectual Property Office on Jul. 23, 2020, the disclosure of which are incorporated herein by reference in its entirety.

TECHNICAL FIELD

The present disclosure relates to the field of display technology, and in particular to a display device and a method for manufacturing the display device.

BACKGROUND

With the application of vehicle-mounted liquid crystal display technology becomes more and more wide, the structure of a vehicle-mounted display device becomes more and more diversified. A common vehicle-mounted display device includes a back plate, a display panel and a cover plate. In the process of manufacturing the display device, the display panel is fixed to the cover plate first, and then the cover plate is fixed to the back plate.

DISCLOSURE OF DISCLOSURE

An embodiment of the present disclosure provides a display device, including: a back plate, a cover plate and a display panel, the cover plate is opposite to the back plate, the cover plate has a central area and a peripheral area surrounding the central area, the display panel is fixed to a side of the cover plate facing the back plate and located in the central area, the back plate includes a base plate and a side wall part formed by bending and extending an edge part of the base plate toward the cover plate, a surface of the side wall part facing the cover plate is a bonding surface;

a portion of areas on the bonding surface are provided with a supporting structure, the supporting structure is configured to support the cover plate, the supporting structure includes a plurality of bumps with a same height and arranged at intervals, where surfaces of the bumps facing the cover plate contact the peripheral area of the cover plate; and a structural adhesive is provided between a portion, which is not provided with the supporting structure, of the bonding surface and the cover plate, and the structural adhesive is configured to fix the cover plate to the bonding surface.

In some implementations, the bumps are located in an area on a side of the bonding surface proximal to an inner wall of the side wall part, and side surfaces of the bumps proximal to the inner wall are flush with the inner wall.

In some implementations, all of the bumps surround an area of the base plate on the bonding surface.

In some implementations, a ratio of a distance between adjacent bumps to a length of each of the bumps ranges from 5 to 10.

In some implementations, a ratio of the length of the bump to a height of the bump ranges from 12 to 40.

In some implementations, a ratio of a width of the bonding surface to a width of the bump ranges from 2.5 to 4.

In some implementations, each of the bumps has a length ranging from 6 mm to 8 mm, and a distance between adjacent bumps ranges from 45 mm to 60 mm.

In some implementations, a width of each of the bumps ranges from 0.5 mm to 0.8 mm.

In some implementations, the height of each of the bump ranges from 0.2 mm to 0.5 mm.

In some implementations, the bumps, the side wall part, and the base plate are integrally formed into one piece.

An embodiment of the present disclosure provides a method for manufacturing the display device described above, including:

forming the back plate, the back plate includes the base plate and the side wall part formed by bending and extending the edge part of the base plate toward the cover plate, a surface of the side wall part facing the cover plate is a bonding surface, a portion of areas on the bonding surface are provided with a supporting structure, the supporting structure is configured to support the cover plate, the supporting structure includes a plurality of bumps with a same height and arranged at intervals;

fixing the display panel to the central area on a side of the cover plate;

coating a structural adhesive on the bonding surface, where the height of the structural adhesive is greater than those of the bumps;

aligning a side of the cover plate fixed with the display panel to the bonding surface, and making surfaces of the bumps facing the cover plate contact the peripheral area of the cover plate; and curing the structural adhesive so as to fix the cover plate to the bonding surface by the cured structural adhesive.

In some implementations, the bumps are located in an area on a side of the bonding surface proximal to the inner wall of the side wall part, and all of the bumps surround the area where the base plate is located on the bonding surface;

the coating the structural adhesive on the bonding surface includes:

coating the structural adhesive on an area of the bonding surface on a side of the bumps away from the inner wall and surrounding the area where the base plate is located.

In some implementations, the structural adhesive does not contact the bumps during coating the structural adhesive on the area of the bonding surface on the side of the bumps away from the inner wall and surrounding the area where the base plate is located.

In some implementations, a ratio of a height to a width of the structural adhesive coated on the bonding surface ranges from 0.4 to 0.6.

In some implementations, a ratio of a width of the structural adhesive coated on the bonding surface to a width of the bonding surface ranges from 0.5 to 0.75.

DRAWINGS

DETAILED DESCRIPTION

In order to make those skilled in the art better understand the technical solution of the present disclosure, a display device and a method for manufacturing the display device provided by the present disclosure are described in detail below with reference to the accompanying drawings.

In the display device of related art, the cover plate and the back plate are generally fixed together by a double-sided adhesive tape; in practical application, it is found that the bonding strength of the double-sided adhesive is limited, and in order to ensure the fixing firmness between the cover plate and the back plate, the adhesive area of the double-sided adhesive is required to be relative large, so that the overall bezel width of the display device is relative large; in addition, the cover plate has a certain warping degree, and a surface of the back plate to be fixed with the cover plate is a plane, after the cover plate and the back plate are fixed together through the double-sided adhesive tape, if the warping degree of the cover plate is too large, the double-sided adhesive tape will generate a large pulling force on the cover plate, so that large stress will be formed in the cover plate, and when the stress is transferred to the display panel, the display panel is prone to light leakage.

Figure 1:
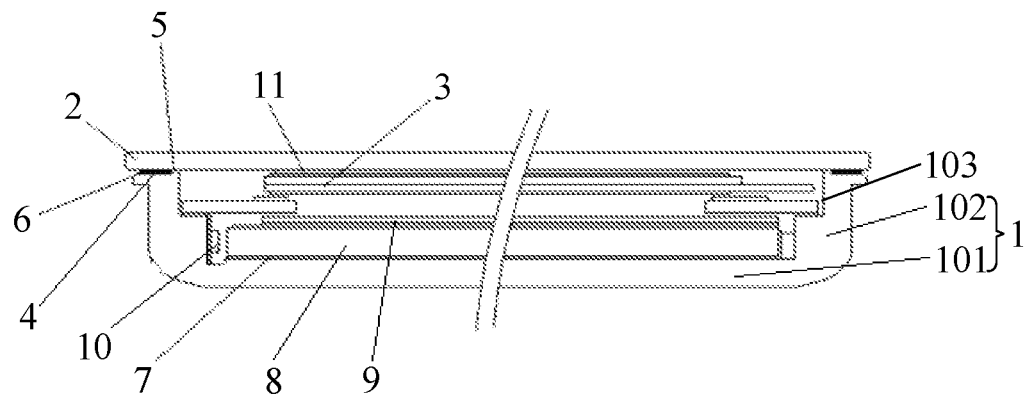
FIG. 1 is a schematic cross-sectional diagram of a display device according to an embodiment of the present disclosure.
Figure 2:
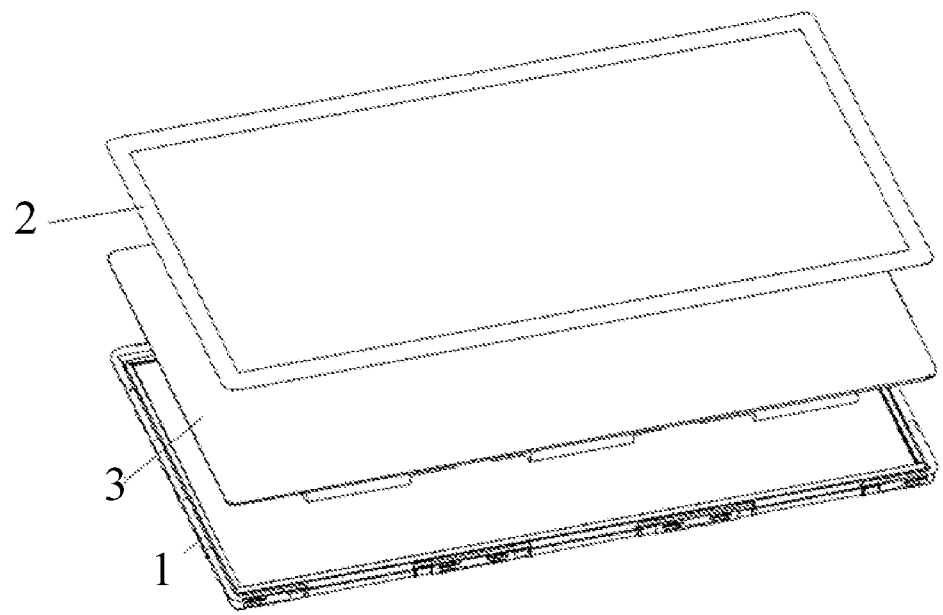
FIG. 2 is a schematic structural diagram of a back plate, a cover plate and a display panel that have not been assembled according to an embodiment of the present disclosure.
Figure 3:
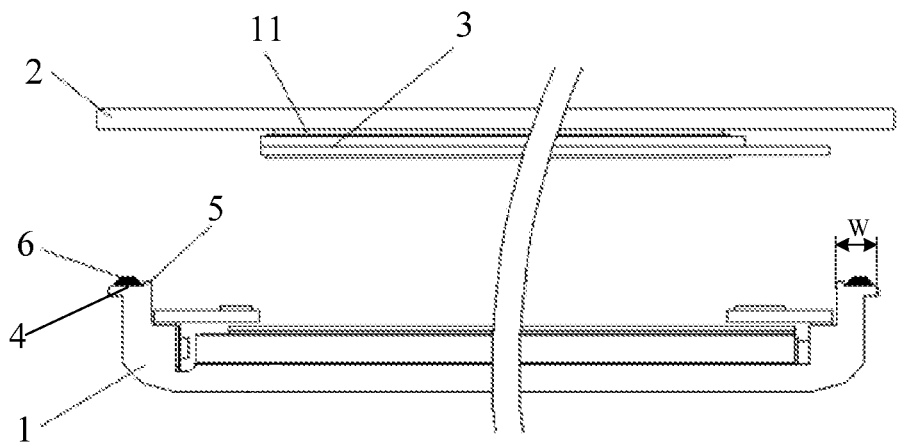
FIG. 3 is a schematic cross-sectional diagram illustrating that a display panel is fixed to a cover plate and the cover plate is not fixed to a back plate according to an embodiment of the present disclosure.
Figure 4:
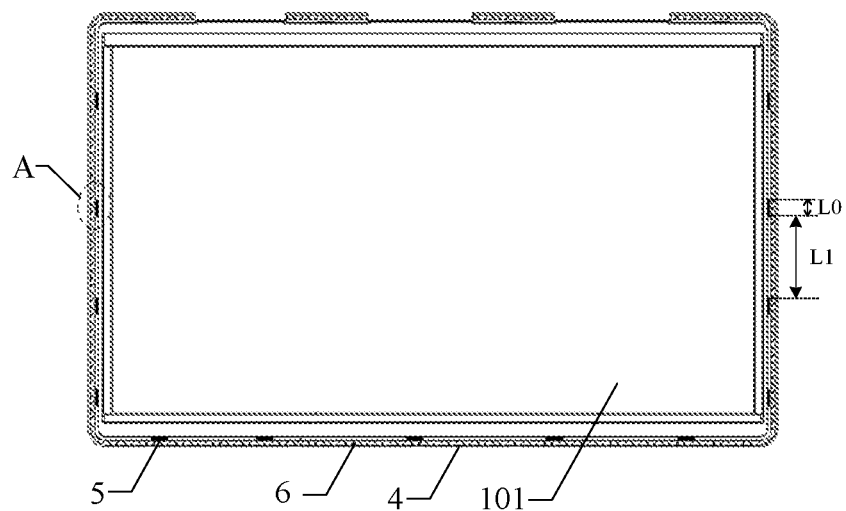
FIG. 4 is a top view of a back plate with structural adhesive applied to a bonding surface thereof and not being fixed to a cover plate according to an embodiment of the present disclosure.

FIG. 1 is a schematic cross-sectional diagram of a display device according to an embodiment of the present disclosure, FIG. 2 is a schematic structural diagram of a back plate, a cover plate and a display panel that have not been assembled according to an embodiment of the present disclosure, FIG. 3 is a schematic cross-sectional diagram illustrating that a display panel is fixed to a cover plate and the cover plate is not fixed to a back plate according to an embodiment of the present disclosure, FIG. 4 is a top view of a back plate with structural adhesive applied to a bonding surface thereof and not being fixed to a cover plate according to an embodiment of the present disclosure, and as shown in FIG. 1 to FIG. 4, the display device includes: a back plate 1, a cover plate 2 and a display panel 3; where, the cover plate 2 is provided opposite to the back plate 1, and cover plate 2 has a central area and a peripheral area surrounding the central area, and display panel 3 is fixed to a side of the cover plate 2 facing the back plate 1 and is located in the central area. The back plate 1 includes: a base plate 101 and a side wall part 102 formed by bending and extending an edge part of the base plate 101 toward the cover plate 2, a surface of the side wall part 102 facing the cover plate 2 is a bonding surface 4. The bonding surface 4 is in a shape of a Chinese character '回' and surrounds an area of the base plate 101. The side wall part 102 has an inner wall 103, and the inner wall 103 is an inner surface of the side wall part proximal to the base plate 101.

A portion of areas on the bonding surface 4 are provided with a supporting structure, and the supporting structure is used for supporting the cover plate 2, and the supporting structure includes: a plurality of bumps 5 with a same height and arranged at intervals, where a surface of each of the bumps 5 facing the cover plate 2 contacts the peripheral area of the cover plate 2. A structural adhesive 6 is provided between a portion, which is not provided with the supporting structure, of the bonding surface 4 and the cover plate 2, and the structural adhesive 6 is used for fixing the cover plate 2 to the bonding surface 4.

The structural adhesive 6 is an adhesive which has high strength (compression strength is greater than 65 MPa, steel-steel positive tensile bonding strength is greater than 30 MPa, and shear strength is greater than 18 MPa), can bear relatively large load, is aging-resistant, fatigue-resistant and corrosion-resistant, has stable performance in the expected life, and is suitable for strong bonding of structural parts.

In the embodiment of the present disclosure, since the structural adhesive 6 has a better adhesive strength, an adhesive area required when the back plate 1 and the cover plate 2 are fixed together is relatively small, and the overall bezel width of the display device can be correspondingly reduced, which is beneficial to realizing a narrow bezel. In some implementations, a width W of the bonding surface 4 ranges from 1.5 mm to 5 mm.

Meanwhile, in the process of fixing the back plate 1 to the cover plate 2 by using the structural adhesive 6, since the structural adhesive 6 is first in a liquid state, and the curing of the structural adhesive 6 is a slow process, the appearance of the structural adhesive 6 can adapt to the warping degree of the cover plate 2 in the curing process, the structural adhesive 6 will not generate a pulling force on the cover plate 2, and the problem of light leakage of the display panel 3 caused by stress can be avoided. In addition, the bumps 5 support the cover plate 2 to ensure that the structural adhesive 6 has a certain thickness, thereby ensuring the adhesion firmness; meanwhile, interval areas between the bumps 5 can be filled with the structural adhesive 6, so that the adhesive area can be increased under the condition that the width W of the bonding surface 4 is not increased, and the adhesion firmness is further increased.

In some implementations, the display panel 3 is a liquid crystal display (LCD) panel 3, which includes an array substrate and an opposite substrate disposed opposite to each other. In some implementations, the display panel 3 further includes a touch module (e.g., capacitive touch module, resistive touch module, etc.), and the touch module is combined with the display panel 3 (e.g., liquid crystal display panel) in a plug-in manner, an ON-CELL manner, or an IN-CELL manner to form a touch display panel. The technical solution of the present disclosure does not limit the specific structure of the display panel 3.

In some implementations, the cover plate 2 is made of glass to protect the display panel 3; further, a attaching layer 11 is coated between the cover plate 2 and the display panel 3 to attach and fix the display panel 3 to the cover plate 2; the attaching layer 11 may be made of a material such as an Optical Clear Resin (OCR), an Optically Clear Adhesive (OCA) or the like.

In some implementations, a material of the back plate 1 includes an aluminum alloy, for example, the back plate 1 is of a die cast aluminum structure; namely, the back plate 1 is formed by die-casting an aluminum alloy material, and the bumps 5, the side wall part 102 and the base plate 101 can be integrally formed; the back plate 1 of the die cast aluminum structure is large in heat dissipation area, and the entire heat dissipation effect of the display device can be improved.

In some implementations, the display device is a vehicle-mounted display device, and the back plate 1 may be made to have different complex shapes through a die-casting process, so that the back plate can be conveniently installed and fixed in an automobile.

In some implementations, the side wall part 102 and the base plate 101 define a receiving cavity, the display device further includes a reflective sheet 7, a light guide plate 8 and a set of optical films 9, which are sequentially stacked in the receiving cavity along a direction away from the base plate 101, and a light source 10 is disposed on a light incident side of the light guide plate 8; the set of optical films 9 includes a diffusion sheet, a lower prism sheet, and an upper prism sheet. The reflective sheet 7, the light guide plate 8, and the optical films 9 are parallel to the base plate 101. The reflective sheet 7 is fixedly arranged on the base plate 101; in the embodiment of the present disclosure, the light source 10 is fixedly disposed on a position of the side wall part 102 opposite to the light incident side of the light guide plate 8, and a side of the light guide plate 8 facing away from the reflective sheet 7 is a light exiting surface.

Figure 5:
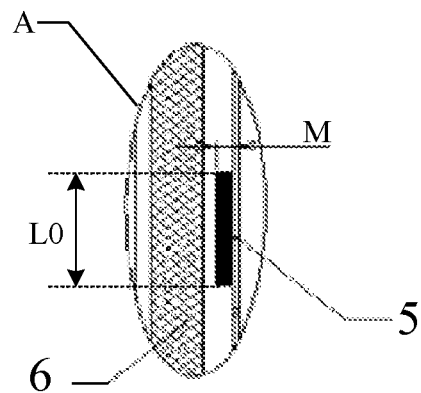
FIG. 5 is an enlarged structural diagram of an area A in FIG. 4.

FIG. 5 is an enlarged view of an area A in FIG. 4, in some implementations, as shown in FIG. 5, the bumps 5 are located at areas of the bonding surface 4 proximal to the inner wall 103 of the side wall part 102, and side surfaces of the bumps 5 proximal to the inner wall 103 are flush with the inner wall 103. Since all the bumps 5 are positioned in the areas of the bonding surface 4 proximal to the inner wall 103, the area of the bonding surface 4 away from the inner wall 103 is continuous, so that continuous adhesive coating can be conveniently performed in the area of the bonding surface 4 at sides of the bumps 5 away from the inner wall 103, the operation process is simple, and the producibility is good. Certainly, in some implementations, the adhesive may be continuously coated on the bonding surface 4 in the area where no bump 5 is formed, and the operation process is simple and the producibility is good.

It should be noted that, the above-mentioned case where the bumps 5 are located in the area of the bonding surface 4 proximal to the inner wall 103 of the side wall part 102, and the side surfaces of the bumps 5 proximal to the inner wall 103 are flush with the inner wall 103 is a preferred implementation in the embodiment of the present disclosure, and does not limit the technical solution of the present disclosure. In the embodiment of the present disclosure, the positions of the bumps 5 on the bonding surface 4 can be adjusted according to actual needs, for example, one of any two adjacent bumps 5 may be located on a side of the bonding surface proximal to the inner wall 103, and the other may be located on a side of the bonding surface away from the inner wall 103. For other cases, they are not described here by way of example.

It should be noted that, when the structural adhesive 6 is coated on the bonding surface 4, the height of the structural adhesive 6 should be greater than a height of each of the bumps 5 (a height in a direction perpendicular to a plane where the bonding surface 4 is located). In the process of fixing the cover plate 2 to the back plate 1, the cover plate 2 contacts the structural adhesive 6 first, and then the structural adhesive 6 is extruded until the cover plate 2 contacts the bumps 5. During the process that the cover plate 2 extrudes the structural adhesive 6, the structural adhesive 6 can flow to interval areas between the bumps 5 to increase the adhesive area.

In some implementations, all the bumps 5 are spaced around the base plate 101 on the bonding surface 4, so as to provide a uniform support for the entire peripheral area of the cover plate 2. In practical applications, when the bumps 5 surround the area where the base plate 101 is located on the bonding surface 4, if a ratio of a distance between adjacent bumps 5 to a length of the bump is too large, a portion of areas on the cover plate 2 cannot be effectively supported; if the ratio of the distance between the adjacent bumps 5 to the length of the bump is too small, an area between the adjacent bumps 5 for receiving the structural adhesive 6 is relative small, so that the adhesive area is reduced. In addition, when the distance between the adjacent bumps 5 is 0, the bumps 5 are integrally continuous and in a shape of Chinese character '回', and in such case, due to the limitation of the production process, it is difficult to ensure that heights of the bumps 5 are uniform; when the cover plate 2 is bonded with the back plate, since the heights of the bumps 5 are different, the cover plate 2 may incline, and the bumps 5 cannot contact the cover plate 2 at some positions, resulting in problems such as a gap existing therebetween.

In view of the above considerations, in some implementations, the ratio of the distance between adjacent bumps 5 to the length of each of the bumps 5 ranges 5 to 10. In some implementations, the length L0 of each bump 5 ranges from mm to 8 mm, and the distance L1 between adjacent bumps 5 ranges from 45 mm to 60 mm.

A thickness of the structural adhesive 6 after being cured is the same as the height of each bump 5, and if the height of the bump 5 is relative large, the overall thickness of the display device is relative large; if the height of the bump 5 is relative small, the thickness of the structural adhesive 6 is relative thin, and the adhesion firmness is relative low. In consideration of the above factors, in the embodiment of the present disclosure, a ratio of the length of the bump 5 to the height of the bump 5 ranges from 12 to 40. In some implementations, the length of the bump 5 ranges from 6 mm to 8 mm, and the height of the bump 5 ranges from 0.2 mm to 0.5 mm. In such case, the adhesion firmness between the cover plate 2 and the back plate 1 can be ensured while the overall thickness of the display device is thin.

When designing the widths of the bumps 5, on one hand, it should be ensured that the bumps 5 will not deform in the process of supporting the cover plate 2, on the other hand, it should be ensured that the widths M of the bumps 5 are as small as possible to increase the adhesive area. In view of the above, in some implementations, a ratio of a width of the bonding surface to the width of the bump ranges from 2.5 to 4. In some implementations, the width of the bonding surface is about 2 mm, and the width M of each bump 5 ranges 0.5 mm to 0.8 mm.

In some implementations, the structural adhesive 6 includes a hot glue having a relatively high viscosity in a molten state, which substantially will not flow after being coated onto a surface of a corresponding structure. The hot glue is a plasticity adhesive, has a strong bonding strength, the physical state of the hot glue changes as the temperature changes within a certain temperature range, and the chemical property thereof is unchanged, the hot glue is non-toxic and tasteless, and belongs to an environment-friendly chemical product. In the embodiment of the present disclosure, selecting the hot glue with the above viscosity in a molten state can ensure that the height of the structural adhesive 6 can be higher than those of the bumps 5 and the structural adhesive 6 does not flow to the side surface of the side wall part 102 during the coating process of the structural adhesive 6.

An embodiment of the present disclosure further provides a display device, which can reduce the adhesive area under the condition of ensuring adhesion firmness between the back plate and the cover plate, and is beneficial to realizing a narrow bezel; in addition, the technical solution of the present disclosure can also avoid stress concentration on the cover plate after the cover plate is fixed to the back plate, thereby avoiding the problem of light leakage of the display panel caused by stress.

Figure 6:
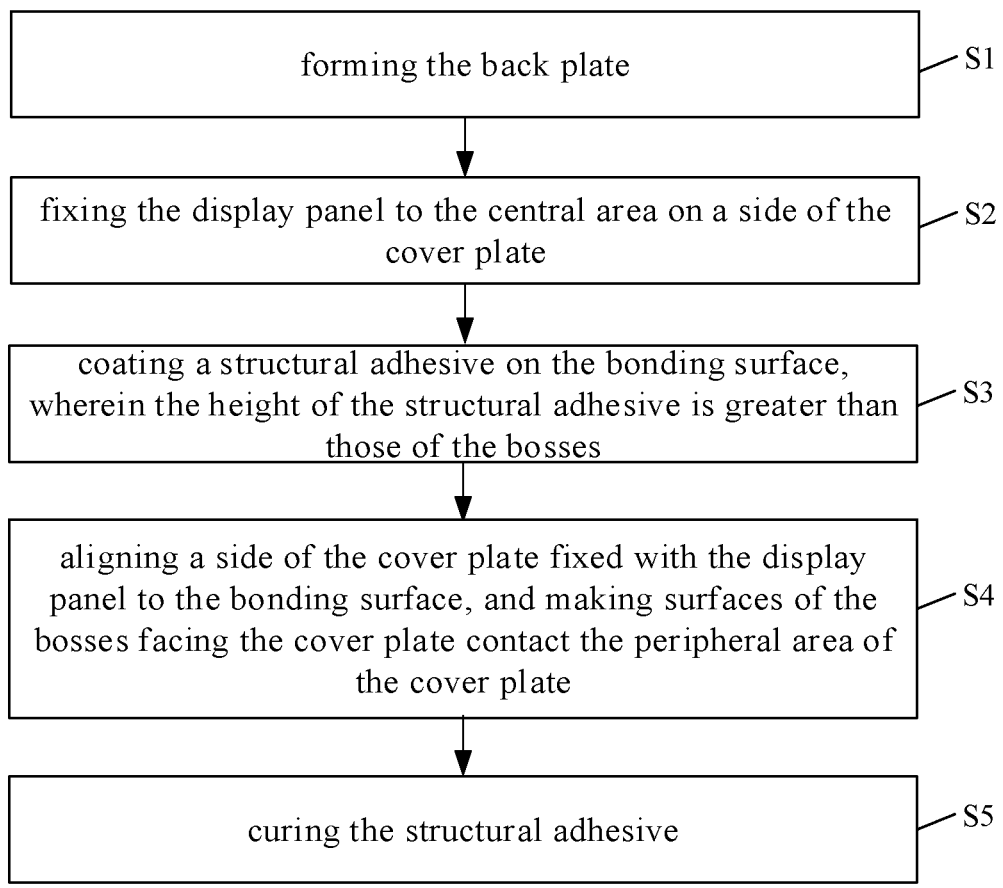
FIG. 6 is a flowchart of a method for manufacturing a display device according to an embodiment of the present disclosure.

FIG. 6 is a flowchart of a method for manufacturing a display device according to an embodiment of the present disclosure, which can be used to manufacture the display device provided in the previous embodiment, and as shown in FIGS. 1 to 6, the manufacturing method includes following steps S1 to S5.

At step S1, forming the back plate.

The back plate 1 includes: a base plate 101 and a side wall part 102 formed by bending and extending an edge part of the base plate 101 toward the cover plate 2, a surface of the side wall part 102 toward the cover plate 2 is a bonding surface 4, and a portion of areas on the bonding face 4 are provided with a supporting structure, and the supporting structure is used for supporting the cover plate 2, and the supporting structure includes: a plurality of bumps 5 having the same height and arranged at intervals.

In the step S1, the base plate 101, the side wall part 102, and the bumps 5, may be formed by a die-casting process and integrally formed into one piece.

At Step S2, fixing a display panel to the central area on a side of the cover plate.

In the step S2, first, an attaching layer 11 is coated on the central area on the side of the cover plate 2, where the attaching layer 11 may be materials such as OCR glue, OCA glue; then, the display panel 3 is bonded and fixed to the central area of the cover plate 2.

At step S3, coating a structural adhesive on the bonding surface, where the height of the structural adhesive is larger than those of the bumps.

In some implementations, the structural adhesive 6 is a hot glue. Firstly, solid hot glue is put into a corresponding coating equipment; the coating equipment includes a heating module and a coating module (with a gluing needle head), where the heating module is used for heating the solid hot glue to obtain molten hot glue, the coating module is used for coating the molten hot glue to corresponding positions, and the gluing needle head can accurately control the glue outlet amount; and then, coating the structural adhesive 6 on the bonding surface by using the coating equipment, where the height of the structural adhesive 6 is greater than those of the bumps 5.

In some implementations, a ratio of a height to a width of the structural adhesive 6 coated on the bonding surface ranges from 0.4 to 0.6; a ratio of the width of the structural adhesive coated on the bonding surface to a width of the bonding surface ranges from 0.5 to 0.75.

In some implementations, the width of the bonding surface is about 2 mm, the height of each bump 5 ranges from 0.2 mm to 0.5 mm, the width of each bump 5 ranges from 0.5 mm to 0.8 mm, the height of the structural adhesive 6 coated on the bonding surface 4 ranges from 0.3 mm to 0.6 mm, the width of the structural adhesive 6 coated on the bonding surface 4 ranges from 1 mm to 1.5 mm, and a sum of the width of the bump 5 and the width of the coated structural adhesive 6 is smaller than the width of the bonding surface.

In some implementations, the bumps 5 are located in an area of the bonding surface 4 proximal to the inner wall, and all of the bumps 5 surround the area of the base plate 101 on the bonding surface 4. In such case, the area of the bonding surface 4 on a side of the bumps 5 away from the inner wall is continuous, and the structural adhesive 6 may be continuously coated on the area of the bonding surface 4 on the side away from the inner wall and surrounding the area where the base plate 101 is located.

Referring to FIG. 4, in some implementations, the coated structural adhesive 6 does not contact the bumps 5. Since a gap exists between the structural adhesive 6 and the bumps 5, in the subsequent process of fixing the cover plate 2 to the back plate 1, the structural adhesive 6 can be filled into the gap when the cover plate 2 extrudes the structural adhesive 6, the structural adhesive 6 can be effectively prevented from flowing to upper surfaces of the bumps 5, and the risk that the structural adhesive 6 flows into the receiving cavity of the back plate 1 is reduced.

At step S4, aligning a side of the cover plate fixed with the display panel to the bonding surface, and making surfaces of the bumps facing the cover plate contact the peripheral area of the cover plate.

In the step S4, the peripheral area of the cover plate 2 is first brought into contact with the structural adhesive 6, and then the cover plate 2 is brought into contact with the bumps 5 by pressing the cover plate 2 downward. In this process, the structural adhesive 6 may flow to the area of the bonding surface 4 not originally coated with the structural adhesive 6, so as to increase the adhesive area.

At step S5, curing the structural adhesive so as to fix the cover plate to the bonding surface by the cured structural adhesive.

In the step S5, the structural adhesive 6 may be cured by static curing at room temperature. In the curing process of the structural adhesive 6, the structural adhesive 6 can adapt to the warping of the cover plate 2 to flow, so that the cured structural adhesive 6 will not generate pulling force on the cover plate 2, and the problem of light leakage of the display panel 3 caused by stress can be avoided.

In some implementations, a step of disposing a light source 10, a reflective sheet 7, a light guide plate 8 and a set of optical films 9 in the receiving cavity of the back plate 1 is further included between the steps S1 and S3.

The display device provided in the previous embodiment can be manufactured through the above steps S1 to S5. In the embodiment of the present disclosure, the back plate and the cover plate are fixed together by adopting the structural adhesive, so that the adhesive area can be reduced while ensuring adhesion firmness between the back plate and the cover plate, which facilitates to realize a narrow bezel; in addition, the technical solution of the present disclosure can also avoid stress concentration on the cover plate after the back plate is fixed to the cover plate, thereby avoiding the problem of light leakage of the display panel caused by stress.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and scope of the present disclosure, and such modifications and improvements are considered to be within the scope of the present disclosure.

The invention claimed is:

1. A display device, comprising: a back plate, a cover plate and a display panel, the cover plate is opposite to the back plate, the cover plate has a central area and a peripheral area surrounding the central area, the display panel is fixed to a side of the cover plate facing the back plate and located in the central area, the back plate comprises a base plate and a side wall part formed by bending and extending an edge part of the base plate toward the cover plate, a surface of the side wall part facing the cover plate is a bonding surface;

a portion of areas on the bonding surface are provided with a supporting structure, the supporting structure is configured to support the cover plate, the supporting structure comprises a plurality of bumps with a same height and arranged at intervals, wherein surfaces of the bumps facing the cover plate contact the peripheral area of the cover plate; and a structural adhesive is provided between a portion, which is not provided with the supporting structure, of the bonding surface and the cover plate, and the structural adhesive is configured to fix the cover plate to the bonding surface.

2. The display device of claim 1, wherein the bumps are located in an area on a side of the bonding surface proximal to an inner wall of the side wall part, and side surfaces of the bumps proximal to the inner wall are flush with the inner wall.

3. The display device of claim 1, wherein all of the bumps surround an area of the base plate on the bonding surface.

4. The display device of claim 2, wherein a ratio of a distance between adjacent bumps to a length of each of the bumps ranges from 5 to 10.

5. The display device of claim 1, wherein a ratio of a length of the bump to a height of the bump ranges from 12 to 40.

6. The display device of claim 1, wherein a ratio of a width of the bonding surface to a width of the bump ranges from 2.5 to 4.

7. The display device of claim 1, wherein each of the bumps has a length ranging from 6 mm to 8 mm, and a distance between adjacent bumps ranges from 45 mm to 60 mm.

8. The display device of claim 1, wherein a width of each of the bumps ranges from 0.5 mm to 0.8 mm.

9. The display device of claim 1, wherein a height of each of the bump ranges from 0.2 mm to 0.5 mm.

10. The display device of claim 1, wherein the bumps, the side wall part, and the base plate are integrally formed into one piece.

11. A method for manufacturing the display device of claim 1, comprising:

forming the back plate, the back plate includes the base plate and the side wall part formed by bending and extending the edge part of the base plate toward the cover plate, a surface of the side wall part facing the cover plate is a bonding surface, a portion of areas on the bonding surface are provided with a supporting structure, the supporting structure is configured to support the cover plate, the supporting structure comprises a plurality of bumps with a same height and arranged at intervals;

fixing the display panel to the central area on a side of the cover plate;

coating a structural adhesive on the bonding surface, wherein the height of the structural adhesive is greater than those of the bumps;

aligning a side of the cover plate fixed with the display panel to the bonding surface, and making surfaces of the bumps facing the cover plate contact the peripheral area of the cover plate; and curing the structural adhesive so as to fix the cover plate to the bonding surface by the cured structural adhesive.

12. The method of claim 11, wherein the bumps are located in an area on a side of the bonding surface proximal to the inner wall of the side wall part, and all of the bumps surround the area where the base plate is located on the bonding surface;

the coating the structural adhesive on the bonding surface comprises:

coating the structural adhesive on an area of the bonding surface on a side of the bumps away from the inner wall and surrounding the area where the base plate is located.

13. The method of claim 12, wherein the structural adhesive does not contact the bumps during coating the structural adhesive on the area of the bonding surface on the side of the bumps away from the inner wall and surrounding the area where the base plate is located.

14. The method of claim 11, wherein a ratio of a height to a width of the structural adhesive coated on the bonding surface ranges from 0.4 to 0.6.

15. The method of claim 11, wherein a ratio of a width of the structural adhesive coated on the bonding surface to a width of the bonding surface ranges from 0.5 to 0.75.

* * * * *